US009731375B2

(12) United States Patent
Friedel et al.

(10) Patent No.: US 9,731,375 B2
(45) Date of Patent: Aug. 15, 2017

(54) METHOD FOR PLASMA-CUTTING A WORKPIECE BY MEANS OF A PLASMA-CUTTING SYSTEM AND PULSATING CURRENT

(75) Inventors: Jens Friedel, Brieske (DE); Gerhard Irrgang, Finsterwalde (DE); Volker Krink, Finsterwalde (DE); Jens Ollmann, Finsterwalde (DE)

(73) Assignee: KJELLBERG FINSTERWALDE PLASMA UND MASCHINEN GMBH, Finsterwalde (DE)

( * ) Notice: Subject to any disclaimer, the term of this patent is extended or adjusted under 35 U.S.C. 154(b) by 612 days.

(21) Appl. No.: 13/499,843

(22) PCT Filed: Sep. 21, 2010

(86) PCT No.: PCT/DE2010/001119
§ 371 (c)(1),
(2), (4) Date: Apr. 5, 2012

(87) PCT Pub. No.: WO2011/038713
PCT Pub. Date: Apr. 7, 2011

(65) Prior Publication Data
US 2012/0199562 A1    Aug. 9, 2012

(30) Foreign Application Priority Data

Oct. 1, 2009  (DE) .................... 10 2009 043 713
Jan. 25, 2010  (DE) .................... 10 2010 005 617

(51) Int. Cl.
*B23K 10/00*   (2006.01)
(52) U.S. Cl.
CPC ............ *B23K 10/00* (2013.01); *B23K 10/006* (2013.01)

(58) Field of Classification Search
CPC .............................. B23K 10/00; B23K 10/006
(Continued)

(56) References Cited

U.S. PATENT DOCUMENTS 4,059,743 A * 11/1977 Esibian et al. ........... 219/121.36
4,292,497 A *  9/1981 Paton et al. ............. 219/130.51
(Continued)

FOREIGN PATENT DOCUMENTS

AT        413 953 B    7/2006
DE      1 615 366 C3   3/1975
(Continued)

OTHER PUBLICATIONS

International Search Report for PCT/DE2010/001119.

*Primary Examiner* — David Angwin
*Assistant Examiner* — John J Norton
(74) *Attorney, Agent, or Firm* — Jonathan M. D'Silva; MMI Intellectual Property

(57) ABSTRACT

A method for plasma cutting a workpiece comprises providing a plasma cutting system having a plasma current source and a plasma torch, the plasma torch having an electrode and nozzle where the nozzle is a small distance from the electrode at a lower end of the plasma torch, forming a plasma chamber between the nozzle and the electrode. A current is produced with a plasma current source and the current flows through the plasma torch during the plasma cutting process. The current is then brought to pulsation during at least a partial time period during the plasma cutting process, with the pulsation occurring in a targeted or controlled manner with a freely selectable frequency.

29 Claims, 20 Drawing Sheets

(58) Field of Classification Search
USPC ............. 219/121.44, 121.39, 121.59, 121.54
See application file for complete search history.

(56) References Cited

U.S. PATENT DOCUMENTS

| | | | |
|---|---|---|---|
| 4,418,266 A * | 11/1983 | Rosenbeck | B23K 9/032 |
| | | | 219/124.34 |
| 4,584,465 A * | 4/1986 | Mathisson et al. | 219/383 |
| 4,912,296 A * | 3/1990 | Schlienger | 219/121.59 |
| 4,935,865 A * | 6/1990 | Rowe | C25F 7/00 |
| | | | 204/224 M |
| 4,983,807 A * | 1/1991 | Yamada et al. | 219/121.48 |
| 5,187,341 A * | 2/1993 | Graell | B23H 1/022 |
| | | | 219/69.13 |
| 5,376,768 A * | 12/1994 | Pasquini et al. | 219/121.57 |
| 5,424,507 A * | 6/1995 | Yamaguchi | B23K 10/006 |
| | | | 219/121.39 |
| 5,506,384 A * | 4/1996 | Yamaguchi | B23K 10/006 |
| | | | 219/121.54 |
| 5,643,475 A * | 7/1997 | Karino et al. | 219/121.57 |
| 5,844,196 A * | 12/1998 | Oakley | 219/121.54 |
| 6,023,037 A * | 2/2000 | Church | B23K 9/1006 |
| | | | 219/121.39 |
| 6,194,682 B1 * | 2/2001 | Schneider | B23K 10/00 |
| | | | 219/121.48 |
| 6,222,154 B1 * | 4/2001 | Yamaguchi et al. | 219/121.39 |
| 6,255,618 B1 * | 7/2001 | Shintani | B23K 10/006 |
| | | | 219/121.45 |
| 6,274,841 B1 * | 8/2001 | Ramakrishnan et al. | 219/121.44 |
| 6,384,376 B1 * | 5/2002 | Plottier | B23K 9/09 |
| | | | 219/130.51 |
| 6,469,274 B1 * | 10/2002 | Delzenne et al. | 219/121.44 |
| 7,061,189 B2 * | 6/2006 | Newman, Jr. | H05B 41/28 |
| | | | 315/247 |
| 7,087,855 B2 * | 8/2006 | Yamaguchi et al. | 219/121.39 |
| 8,049,140 B2 * | 11/2011 | Kawamoto | B23K 9/092 |
| | | | 219/130.21 |
| 2005/0247680 A1 * | 11/2005 | Kwon et al. | 219/121.46 |
| 2006/0163216 A1 * | 7/2006 | Brandt et al. | 219/121.39 |

FOREIGN PATENT DOCUMENTS

| | | | |
|---|---|---|---|
| DE | 23 46 862 A1 | | 8/1975 |
| DE | 2346862 A | * | 8/1975 |
| DE | 699 19 211 T2 | | 8/2005 |
| DE | 10 2004 049 445 A1 | | 4/2006 |
| JP | 61 262464 A | | 11/1986 |
| JP | 11 347741 A | | 12/1999 |
| SU | 854 651 B | | 8/1981 |
| SU | 854651 B | * | 8/1981 |
| WO | WO 2008/125275 A1 | | 10/2008 |
| WO | WO 2008125275 A1 | * | 10/2008 |

* cited by examiner

METHOD FOR PLASMA-CUTTING A WORKPIECE BY MEANS OF A PLASMA-CUTTING SYSTEM AND PULSATING CURRENT

BACKGROUND

The present invention relates to a method for plasma cutting a workpiece by means of a plasma cutting system including a plasma current source and a plasma torch which comprises an electrode and a nozzle that is a small distance from the electrode at a lower end of the plasma torch in order to form a plasma chamber there-between.

By way of plasma, a conductive gas is used which can be heated to a high temperature level and which consists of positive and negative ions as well as excited and neutral atoms and molecules.

By way of plasma gas, different gases, for example monoatomic argon and/or diatomic gases hydrogen, nitrogen, oxygen or air, are used. These gases ionise and dissociate through the energy of an arc. The arc which is tapered through a nozzle is then described as a plasma jet.

The plasma jet can be greatly influenced in its parameters by the design of the nozzle and electrode. These parameters of the plasma jet are, for example, the jet diameter, the temperature, the energy density, and the flow speed of the gas.

During plasma cutting, for example, the plasma is tapered through a nozzle which can be gas-cooled or water-cooled. Energy densities of up to $2\times10^6$ W/cm$^2$ can thereby be achieved. Temperatures of up to 30,000° C. arise in the plasma jet which facilitate, in association with the high flow speed of the gas, very high cutting speeds on the materials.

Plasma cutting systems generally consist of at least one current source, a plasma torch, and a gas supply.

Due to the high thermal load on the nozzle, the nozzle is generally constructed of a metal material, preferably copper, due to its high electrical conductivity and heat conductivity. The same applies to the electrode holder which can also be constructed of silver. The nozzle is then used in a plasma torch, the main components of which are a plasma torch head, a nozzle cap, a plasma gas conveying part, a nozzle, a nozzle holder, an electrode receiving element, an electrode holder with emission insert and, in the case of modern plasma torches, a nozzle protection cap holder and a nozzle protection cap. The electrode holder fixes a sharp electrode insert made of tungsten which is suitable for the use of non-oxidising gases as plasma gas, for example, an argon-hydrogen mixture. A flat electrode, the emission insert of which consists of zirconium or hafnium for example, is also suitable for the use of oxidising gases as plasma gas, such as, for example, air or oxygen. Zirconium can be used for oxygen-containing plasma gas. Due to its better thermal properties, however, hafnium is better suited as its oxide is more temperature-resistant.

In order to achieve a long lifespan for the nozzle and the electrode, cooling is often effected with a liquid, for example water, but it can also be carried out with a gas. In this respect a distinction is made between liquid-cooled and gas-cooled plasma torches.

In order to achieve a long lifespan of the electrode, the high temperature material is incorporated as an emission insert into the holder which is then cooled. The most efficient type of cooling is liquid cooling. The arc burns between the emission insert of the electrode and the nozzle and/or the workpiece to be cut. During operation the emission insert is gradually worn away and a hole is drilled in the electrode.

It frequently also arises that the arc goes on to the electrode holder and destroys it. This occurs particularly when the emission insert has burnt back deeper than 1 mm, and has the effect of damaging the electrode which must then be replaced.

The current sources used for plasma cutting are predominantly direct current sources with a greatly falling characteristic curve or constant current curve. Fluctuations of the cutting voltage caused by the process thereby have no effect or very little effect upon the cutting current. These fluctuations are caused, for example, by different torch distances from the workpiece, by fluctuations in the gas supply, and through wear of components of the plasma torch.

Examples for current sources with a greatly falling characteristic curve are scattering field or scattering core transformers with a subsequently arranged rectifier. The falling characteristic is produced here through the arrangement of the coils of the transformer.

In the case of modern direct current sources, the constant current curve is realised through the regulation of the cutting current using electronic components, e.g. thyristors and transistors. In principle it is possible to distinguish here between network-guided current sources and current sources with increased frequency.

Network-guided current sources are those in which the intervention time of the regulation is determined by the frequency of the voltage of the current supply network and its zero-crossing. A variant is a transformer with a subsequently arranged thyristor-controlled rectifier. The minimum intervention time possible for the regulation in the rectifier amounts, according to the circuit variant, to between 6.6 ms with a 3-pulse bridge circuit and 1.6 ms with a 12-pulse bridge circuit.

Current sources with increased frequency have substantially lower intervention times for the regulation as the frequency is clearly higher than the frequency of the network voltage. The intervention times, depending upon the frequency of the current source, lie between 100 µs and 5 µs.

One such variant configuration includes a transformer, an unregulated diode rectifier, and a subsequently arranged transistor switch, also described as a chopper, which regulates the current. A further variant, often called an inverter, consists of an unregulated diode rectifier, an inverter, a transformer, and a diode rectifier. A frequency of between 10 and 200 kHz is used as a frequency for the chopper and the inverter.

According to the prior art—apart from undesired but unavoidable noise or undesired harmonics—a direct current which is as even as possible is required for good cutting quality and long lifespan of the parts of the plasma torch that are subject to wear. For this, mostly inductive structural units (restrictors) are arranged in the current circuit of the cutting current in order to reduce the ripples caused by the current network and the switching processes of the current source.

Current sources which work with a higher frequency can, in contrast with network-guided current sources, regulate the ripples of the direct current caused by the frequency of the network voltage as the frequency of the current source is clearly higher than the frequency of the network voltage. Often such current sources are only available in a limited power, e.g. 10 to 20 kW. For this reason, a plurality of current sources are arranged in parallel. Network-guided current sources and current sources with increased frequency can be arranged in parallel.

SUMMARY

The invention is intended to increase the lifespan of an electrode.

According to the invention, this object is achieved according to a first aspect by a method for plasma cutting of a workpiece using a plasma cutting system that has a plasma current source and a plasma torch that comprises an electrode and a nozzle which is at a small distance from the electrode at a lower end of the plasma torch in order to form a plasma chamber therebetween, a current I produced by the plasma current source and flowing through the plasma torch being brought, at least during a partial time period of the plasma cutting process, in a targeted or controlled manner to pulsation with a freely selectable frequency f in the range of from about 30 Hz to 500 Hz. In some embodiments, the freely selectable frequency f is in the range of about 35 Hz to 500 Hz. Some contemplated embodiments have the frequency f in the narrower range of about 55 Hz to 400 Hz, or in the yet narrower range of from about 65 Hz to 300 Hz.

According to a second aspect of the invention, a method for plasma cutting of a workpiece utilizes a plasma cutting system that comprises a plasma current source and a plasma torch which has an electrode and a nozzle which is at a small distance from the electrode at a lower end of the plasma torch in order to form a plasma chamber therebetween, characterised in that a current I produced by the plasma current source and flowing through the plasma torch is brought, at least during a partial time period of the plasma cutting process, in a targeted or controlled manner to pulsation with a freely selectable frequency f in the region of from about 0.1 Hz to 30 Hz. In some embodiments, this range is about 0.1 Hz to 29 Hz. In some embodiments this is in the narrower range of about 0.1 Hz to 20 Hz. A pulse can comprise any signal form, such as rectangular form, saw tooth form, etc. In addition, the pulse can be asymmetrical and completely one-sided both in terms of time and in relation to an arithmetic average value or starting value (base value), for example going downwards from the arithmetic average value or starting value.

In some contemplated methods of the invention, the pulsating cutting current $I_S$, with at least one freely selectable peak value $I_{min}$ and/or $I_{max}$, fluctuates in the region of from about 5% to 70%, around its arithmetic average value $I_m$. In other contemplated methods, this range is from about 10% to 50% around the arithmetic average value $I_m$.

In some contemplated embodiments the minimum deviation of a peak value $I_{max}$ and/or $I_{min}$ from the arithmetic average value $I_m$ of the cutting current $I_s$ is about 5 A. In some contemplated embodiments this minimum is 10 A. In other contemplated embodiments this minimum is about 20 A.

In addition it can be provided that the maximum deviation of a peak value $I_{max}$ and/or $I_{min}$ from the arithmetic average value $I_m$ of the cutting current $I_s$ is 200 A. In some contemplated embodiments, this minimum is 100 A.

The sum of the maximum current change speed dI/dt of the cutting current $I_S$ in some contemplated embodiments can amount to 400 A/ms and/or the sum of the minimum current change speed dI/dt of the cutting current $I_s$ can amount to 2 A/ms.

According to a further contemplated embodiment of the invention the scanning ratio $D=t_{Imax}/T$ of the cutting current $I_s$ lies between about 0.1 and 0.9. In some contemplated embodiments this range is between about 0.3 and 0.7.

In some contemplated embodiments, each cutting current impulse of the pulsating cutting current $I_s$ comprises a low threshold duration $t_{Imin}$ and a high threshold duration $t_{Imax}$, such that:

$$t_{Imin}+t_{Imax}=T,$$

with period duration T=1/f and $t_{Imin}$ or $t_{Imax}$<25% of the period duration T, preferably $t_{Imin}$ or $t_{Imax}$<15% of the period duration T.

It is also contemplated that each cutting current pulse of the pulsating cutting current $I_s$ can have a low threshold duration $t_{Imin}$ and a high threshold duration $t_{Imax}$, such that:

$$t_{Imin}+t_{Imax}<T,$$

period duration T=1/f and $t_{Imin}+t_{Imax}$<50% of the period duration T, preferably $t_{Imin}+t_{Imax}$<30% of the period duration T.

The arithmetic average of the cutting voltage can have a value in the range of from about 90 V to 250 V. In some embodiments, it is contemplated this range is in the range of from about 120 V to 220 V.

In some contemplated embodiments the volume flow of the plasma gas (PG) is kept constant. The provided electrode can, in some embodiments, be a flat electrode. Some embodiments also contemplate that the plasma gas is brought into rotation in the plasma chamber.

It is further contemplated that oxygen-containing plasma gas can be used. In addition, it is also contemplated that the arithmetic average of the cutting current $I_s$ can have a value in the range of from about 25 A to 500 A.

The present invention recognizes a finding that even with an even direct current, the abovementioned destruction of the electrode holder arises and the lifespan of the electrode is therefore not particularly long. It has, however, surprisingly been ascertained that the superimposition of direct current cutting current with an alternating current/pulsation of the cutting current have a positive lifespan effect.

Particularly in the case of plasma cutting with an oxygen-containing plasma gas with a plasma torch with a flat electrode which consists at least of an emission insert with a high thermal load capacity and an electrode holder, more than doubling of the lifespan has been achieved. It has been shown that the arc attachment point better remains on the emission insert and does not go onto the electrode holder. The emission insert can thereby "burn downwards" further and the emission insert can be better and longer used. The pulse current leads to better centering of the arc attachment point on the emission insert.

The change in the current can be realised by predefining a corresponding target value and through corresponding design of the current source. This is clarified in the following example. Consider plasma cutting of 15 mm structural steel according to the following parameters:

| | |
|---|---|
| Plasma gas | oxygen |
| Plasma gas pressure | 9 bar |
| Plasma gas volume flow | 1500 l/h |
| Secondary gas | Nitrogen |
| Secondary gas pressure | 6 bar |
| Secondary gas volume flow | 2200 l/h |
| Cutting speed | 2.7 m/min |
| Cutting voltage average value | 135 V |
| Cutting current average value | 160 A |
| Min. cutting current $I_{min}$ | 140 A |
| Max. cutting current $I_{max}$ | 180 A |
| Frequency | 83 Hz |
| Diameter of the nozzle bore | 1.4 mm |

The values relating to the frequency and amplitudes $I_{max}$ (maximum cutting current) $I_{min}$ (minimum cutting current) should be selected so that the current ripples are not reflected on the cutting surface in the form of grooves. It is thus possible to increase the lifespan of the electrode from 3 hours to 8 hours. Even with currents of 360 A, the lifespan can be increased from 2 hours to 6 hours.

BRIEF DESCRIPTION OF THE DRAWINGS

Further features and advantages of the invention ensue from the following description, in which several embodiments of the present invention are described by reference to the drawings, in which.

DETAILED DESCRIPTION

Figure 1:
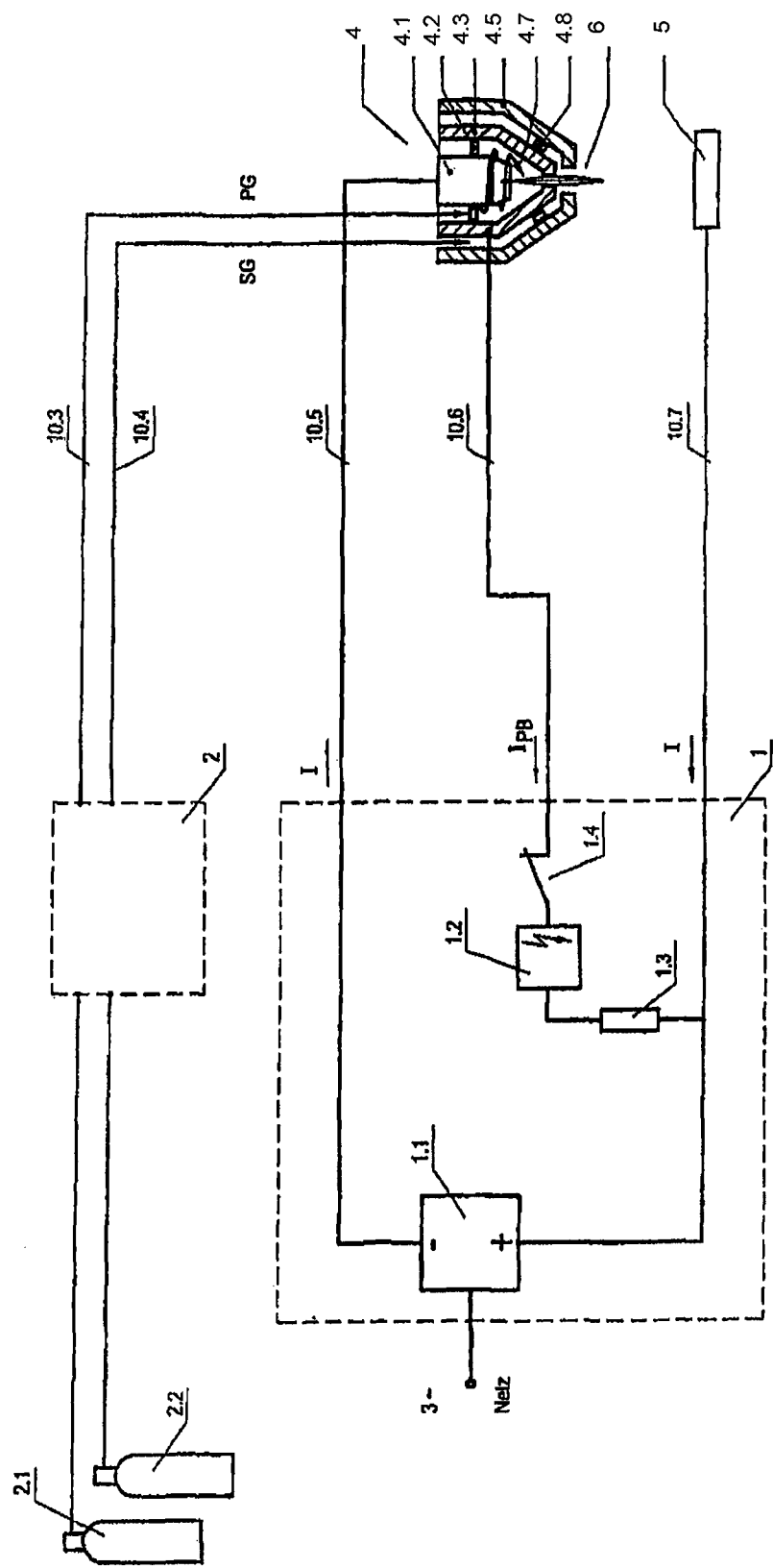
FIG. 1 depicts a schematic diagram of a plasma cutting system according to the prior art.

FIG. 1 depicts a schematic diagram of a plasma cutting system that includes a plasma current source 1, the components of which are a current source 1.1, an ignition unit 1.2, a resistor 1.3, and a contact 1.4. The negative pole of the current source is connected with the line 10.5 to the electrode 4.1 of the plasma torch 4 and the positive pole with the line 10.7 to the workpiece 5, and via the resistor 1.3, the ignition unit 1.2, and the contact 1.4 via the line 10.6 to the nozzle 4.2 of the plasma torch 4. The plasma current source is generally supplied by a three-phase current network, e.g. 400 V 50 Hz, with electrical energy. The gas supply of the plasma torch takes place via the gas console 2, in which there can be valves, e.g. magnetic valves and/or regulating valves (not shown) to switch the gases, in particular the plasma gas (PG) and the secondary gas SG. The gas supply takes place through gas bottles 2.1 for the plasma gas and 2.2. for the secondary gas. In case of cutting non-alloyed or low-alloy steels, oxygen is often used as a plasma gas but an oxygen-containing gas, e.g. air or gas mixture, e.g. nitrogen/oxygen, can also be used. By way of a secondary gas, oxygen can also be used. An oxygen-containing gas, e.g. air or gas mixture, e.g. nitrogen/oxygen or nitrogen can also be used. The plasma gas PG is conveyed via the gas line 10.3 into the space between the electrode 4.1 and nozzle 4.2, the plasma chamber, and the secondary gas SG is conveyed via the gas line 10.4 into the space between the nozzle 4.2 or nozzle cap 4.4 (not shown) and the nozzle protection cap 4.5.

Figure 2:
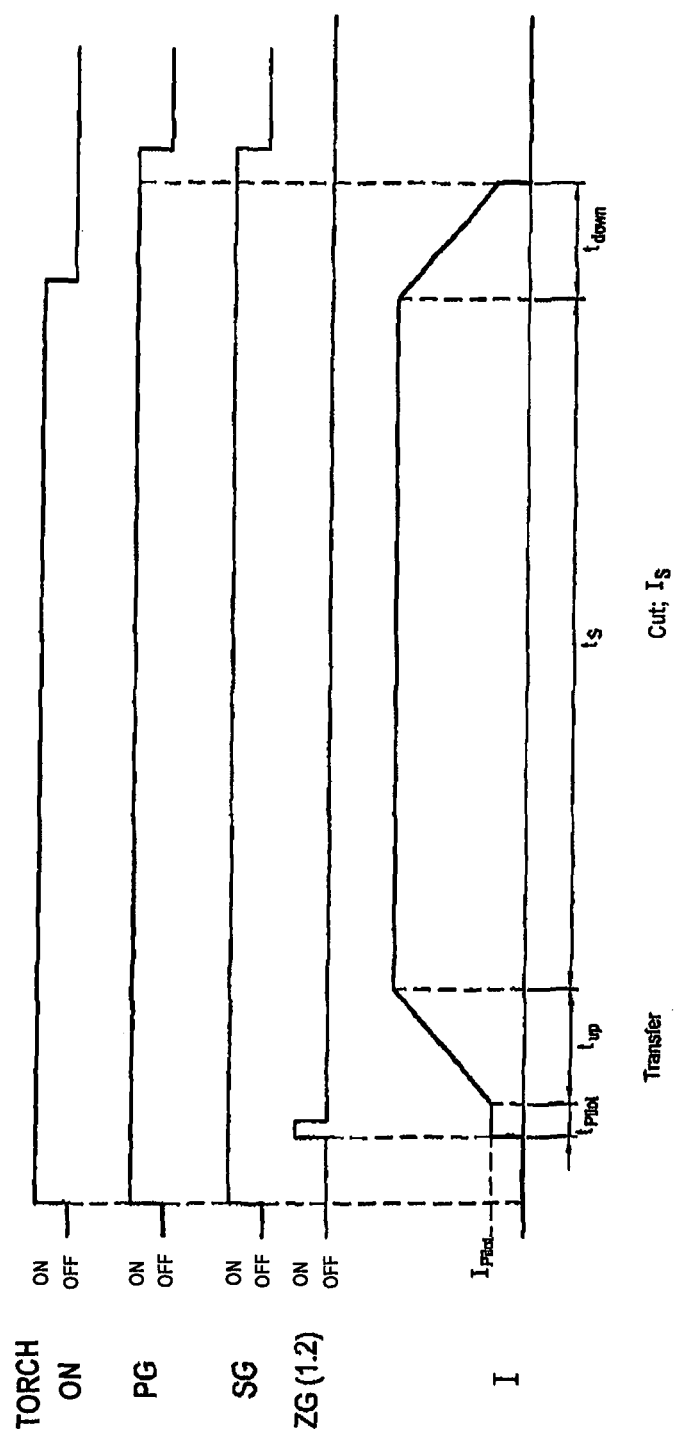
FIG. 2 graphically depicts the course of a plasma cutting process according to the prior art, shown schematically.

Comparing FIG. 1 to FIG. 2, the sequence during plasma cutting according to the prior art is described below. Initially the plasma torch 4 is positioned with the aid of a guide system, for example a CNC-controlled xy coordinate guide machine or a robot at a defined distance from the workpiece 5. The signal sent by the guide system to the plasma current source "torch ON" starts the process. Plasma gas PG and secondary gas SG, controlled by the gas console, then flow through the plasma torch 4. After an amount of time, for example 400 ms, the ignition unit 1.2 ignites with high voltage the pilot arc which burns between the electrode 4.1 and the nozzle 4.2 and ionises the section between the plasma torch 4 and the workpiece 5. The pilot current $I_{pilot}$ is limited by the resistor 1.3. Typical values for the pilot current are 12 to 35 A. The resistor 1.3 simultaneously produces a voltage drop between the nozzle 4.2 and the workpiece 5, which supports the transition of the anodic attachment point from the nozzle to the workpiece. After the transition of the current I the contact 1.4 is opened, the current I is increased during the time $t_{up}$ (range from 50 ms to 500 ms) to the required cutting value. The cutting current $I_s$ forms which flows during the time $t_s$. The values for the cutting current $I_s$ lie, according to the panel thickness to be cut, which can usually be between 1 and 200 mm, between 20 and 1000 A. The current flowing during this time should be as even as possible. The current I flows until the signal "torch ON" is switched off and then the current I is reduced during the time $t_{down}$ and switched off. Usual values for this time are 50 to 500 ms but the current can also be switched off immediately without this time. Plasma gas and secondary gas continue to flow in order to further cool the plasma torch. It is also possible to work with different plasma and secondary gases and also different pressures and gas quantities in the process phases.

Figure 3:
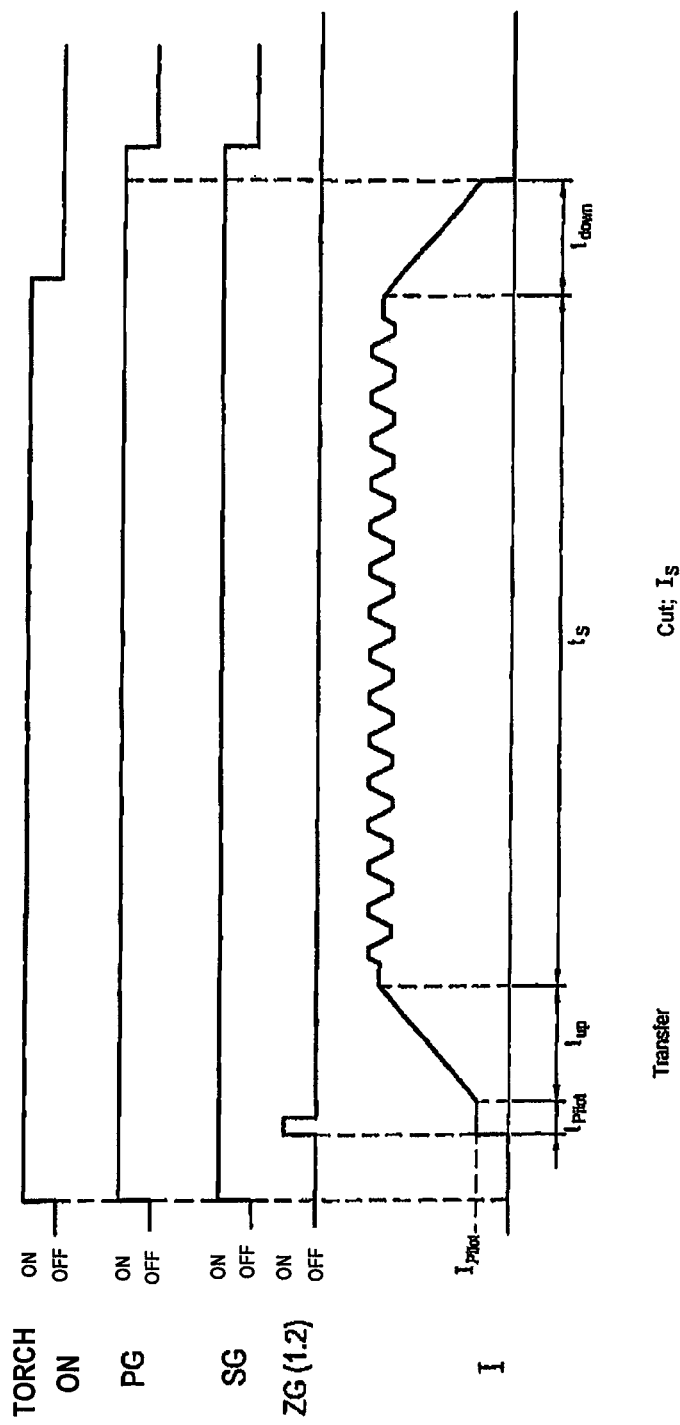
FIG. 3 graphically depicts the course of a plasma cutting process according to a particular embodiment of the present invention, shown schematically.

Referring now to FIG. 3, in contrast with the prior art, a cutting current $I_s$ fluctuates in a defined manner, shown merely by way of example, during the time $t_s$ according to a particular embodiment of the invention. In order to carry out the plasma cutting method according to a particular embodiment of the invention, the plasma cutting system of FIG. 1 can also be used.

Figure 4:
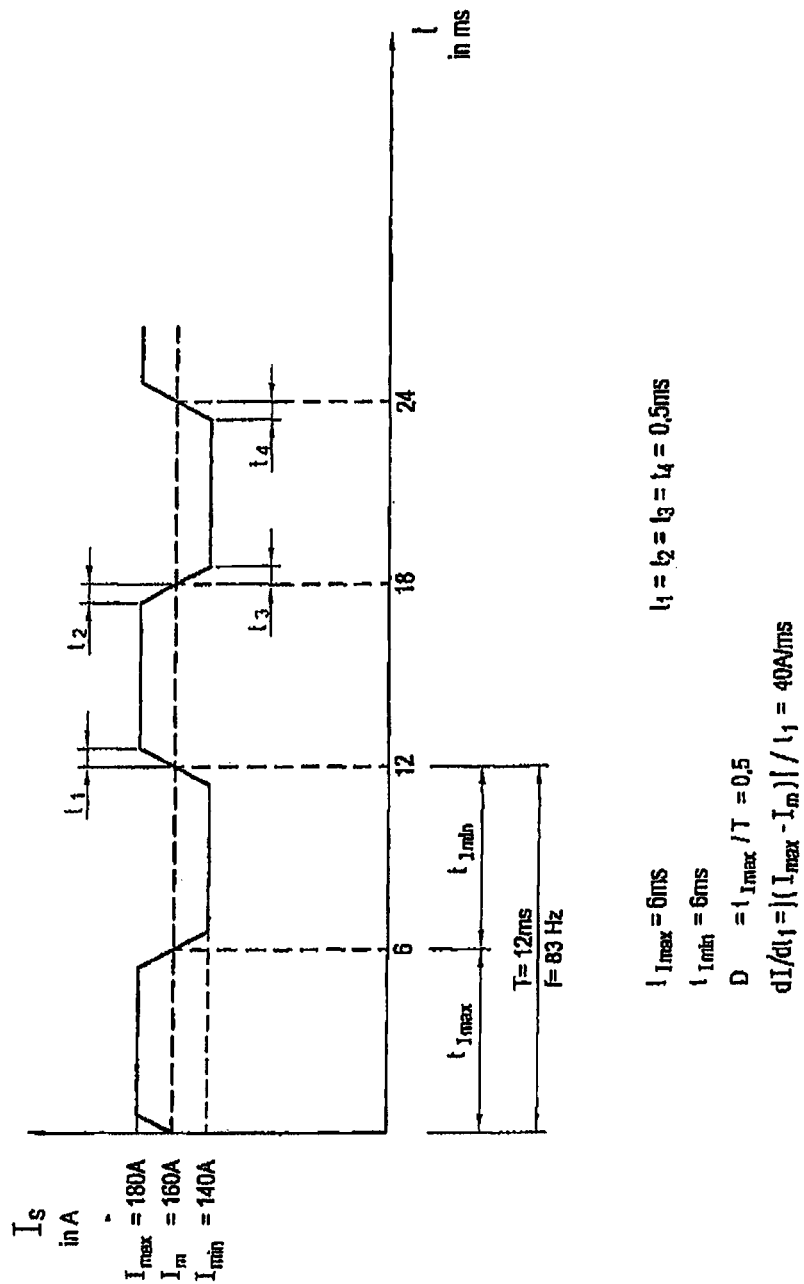
FIGS. 4 through 9 graphically depict particular embodiments of the plasma cutting process according to a first aspect of the present invention.

FIGS. 4 through 9 graphically depict embodiments for cutting current patterns according to the present invention, whereby FIG. 4 relates to the cutting current pattern indicated in FIG. 3.

FIG. 4 graphically depicts a cutout of the current $I_s$ flowing during the time $t_s$. The arithmetic average $I_m$ of the current amounts to 160 A, the maximum current $I_{max}$ is 180 A, and the minimum current $I_{min}$ is 140 A. The deviation of the values $I_{max}$ and $I_{min}$ from the arithmetic average value $I_m$ is of equal magnitude and amounts to 20 A and thus 12.5%. The alternating current superimposed in relation to the direct current is formed trapezoidally.

The current change speeds dI/dt, i.e. the amounts of the current changes in a time which is necessary in order to pass from:

the arithmetic average $I_m$ to the maximum cutting current $I_{max}$ $$dI/dt_1=|(I_{max}-I_m)|/t_1$$

the maximum cutting current $I_{max}$ to the arithmetic average $I_m$ $$dI/dt_2=|(I_m-I_m)|/t_2$$

the arithmetic average value $I_m$ to the minimum cutting current $I_{min}$ $$dI/dt_3=|(I_{max}-I_m)|/t_3$$

the minimum cutting current $I_{min}$ to the arithmetic average $I_m$ $$dI/dt4=|(I_{max}-I_m)|/t_4,$$

are constant, as the amounts of the differences between the maximum cutting current and the arithmetic average of the cutting current and the minimum cutting current and the arithmetic average of the cutting current are respectively 20

A and the respective times t1, t2, t3, t4 are of equal magnitude and respectively 0.5 ms, amounting to 40 A/ms.

$$dI/dt_1=(I_{max}-I_m)/t_1=(180\ A-160\ A)/0.5\ ms=40\ A/ms$$

The period duration T amounts to 12 ms and the frequency f thus 83 Hz. More than a doubling of the lifespan was achieved with this current pattern (see above example of the plasma cutting of 15 mm structural steel).

Figure 5:
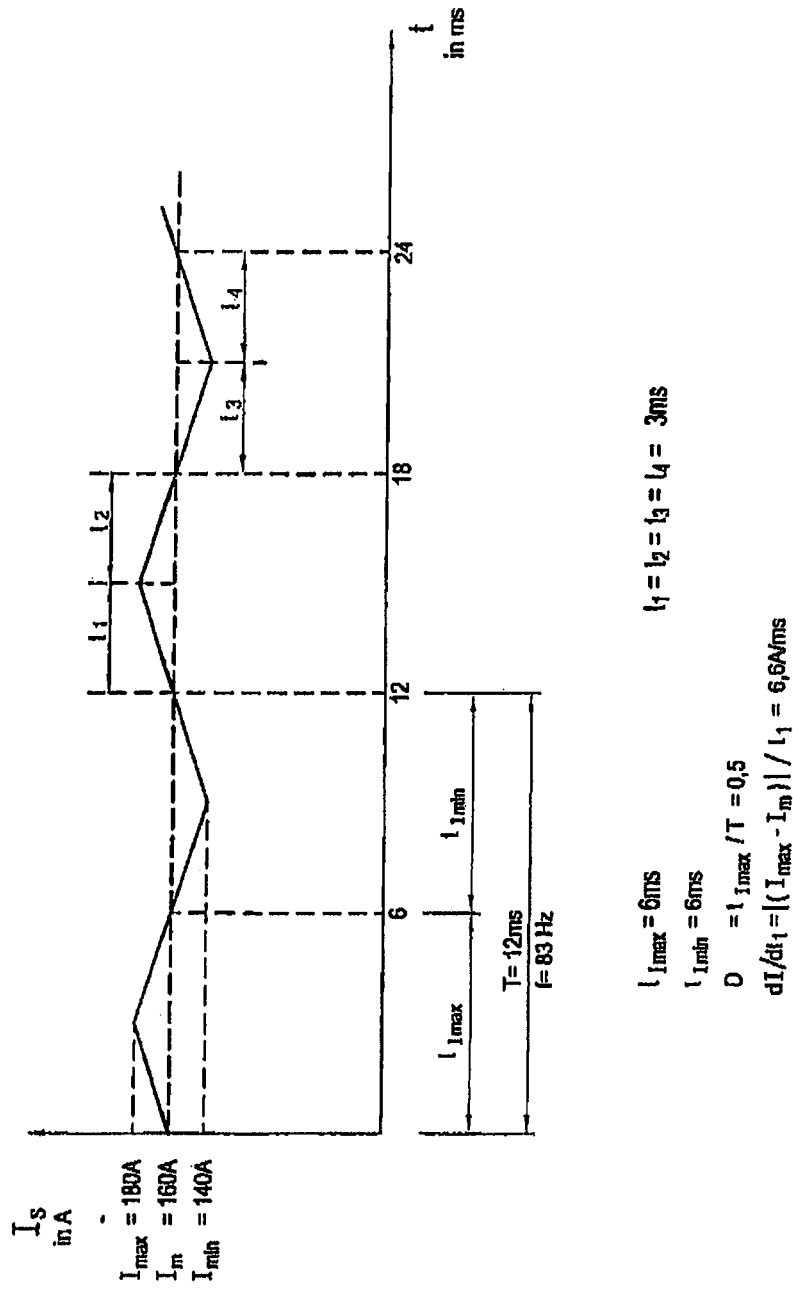

FIG. 5 graphically depicts a triangular current pattern, wherein the period duration, frequency, minimum and maximum cutting current and the arithmetic average of the cutting current are identical to FIG. 4. The current change speeds, being 6.6 A/ms, are lower and of equal magnitude.

Figure 6:
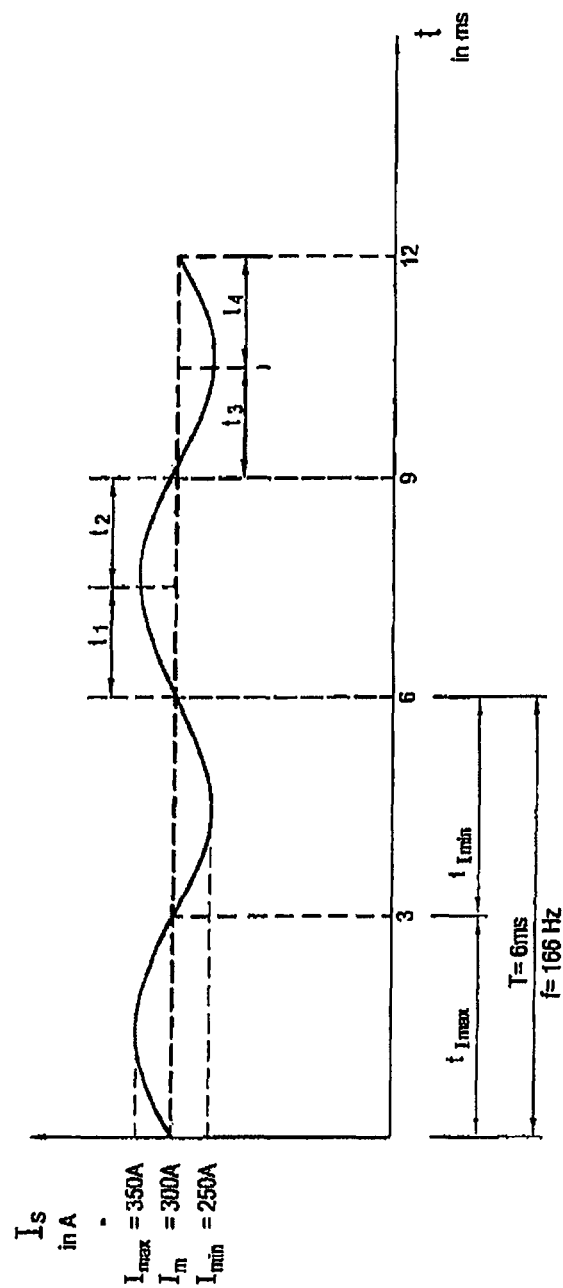

FIG. 6 graphically depicts a sinusoidal current pattern with a period duration of 6 ms and a frequency of 166 Hz. The arithmetic average $I_m$ of the current amounts to 300 A, the maximum current $I_{max}$ is 350 A, and the minimum current $I_{min}$ is 250 A. The deviation of the values $I_{max}$ and $I_{min}$ from the arithmetic average $I_m$ is of equal magnitude and amounts to 50 A and thus 16%. The current change speeds amount to 33 A/ms and are of equal magnitude.

Figure 7:
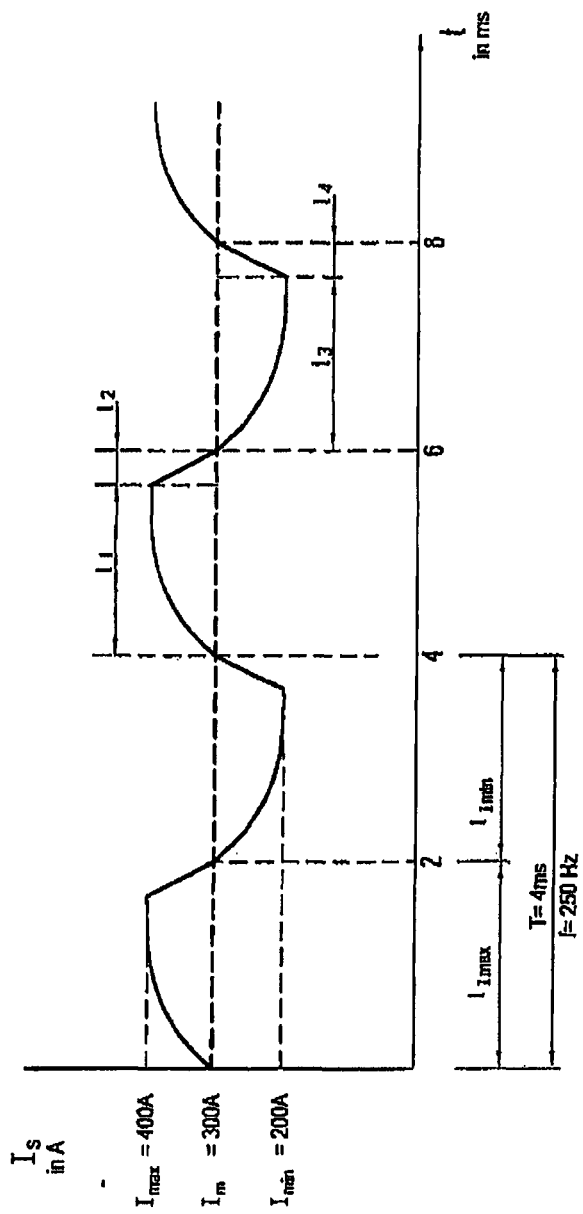

FIG. 7 graphically depicts a current pattern which is similar to an e-function. The period duration amounts to 4 ms and the frequency 250 Hz. The arithmetic average value $I_m$ of the current amounts to 300 A, the maximum current $I_{max}$ is 400 A and the minimum current $I_{min}$ is 200 A. The deviation of the values $I_{max}$ and $I_{min}$ from the arithmetic value $I_m$ is of equal magnitude and amounts to 100 A and thus 33%. The current change speeds in this example are different and have the following values:

$$dI/dt_1=dI/dt_3=100\ A/1.7\ ms=59\ A/ms$$

$$dI/dt_2=dI/dt_4=100\ A/0.3\ ms=333\ A/ms$$

Figure 8:
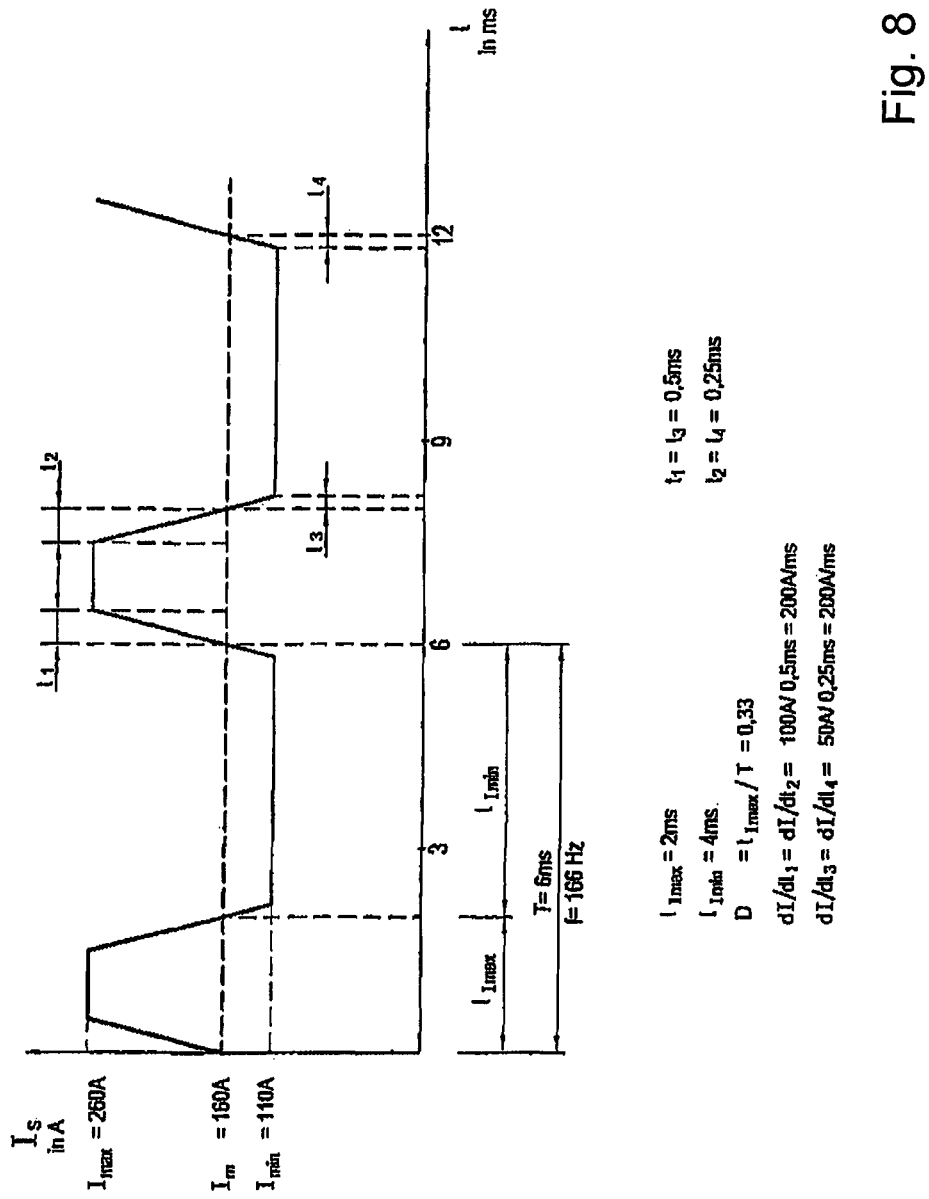

FIG. 8 graphically depicts a trapezoidal current pattern, whereby this time the differences between the maximum cutting current $I_{max}$ and the arithmetic average $I_m$ of the cutting current $I_s$ and between the minimum cutting current $I_{min}$ and the arithmetic average value $I_m$ of the cutting current $I_s$ and the times $t_{Imax}$ (2 ms) and $t_{Imin}$ (4 ms) are different:

$$|Imax-Im|=|260\ A-160\ A|=100\ A$$

$$|Imin-Im|=|110\ A-160\ A|=50\ A$$

The period duration T amounts to 6 ms and the frequency 166 Hz. The current change speeds are of equal magnitude in this example and amount to 200 A/ms.

$$dI/dt_1=dI/dt_2=100\ A/0.5\ ms=200\ A/ms$$

$$dI/dt_3=dI/dt_4=50\ A/0.25\ ms=200\ A/ms$$

Figure 9:
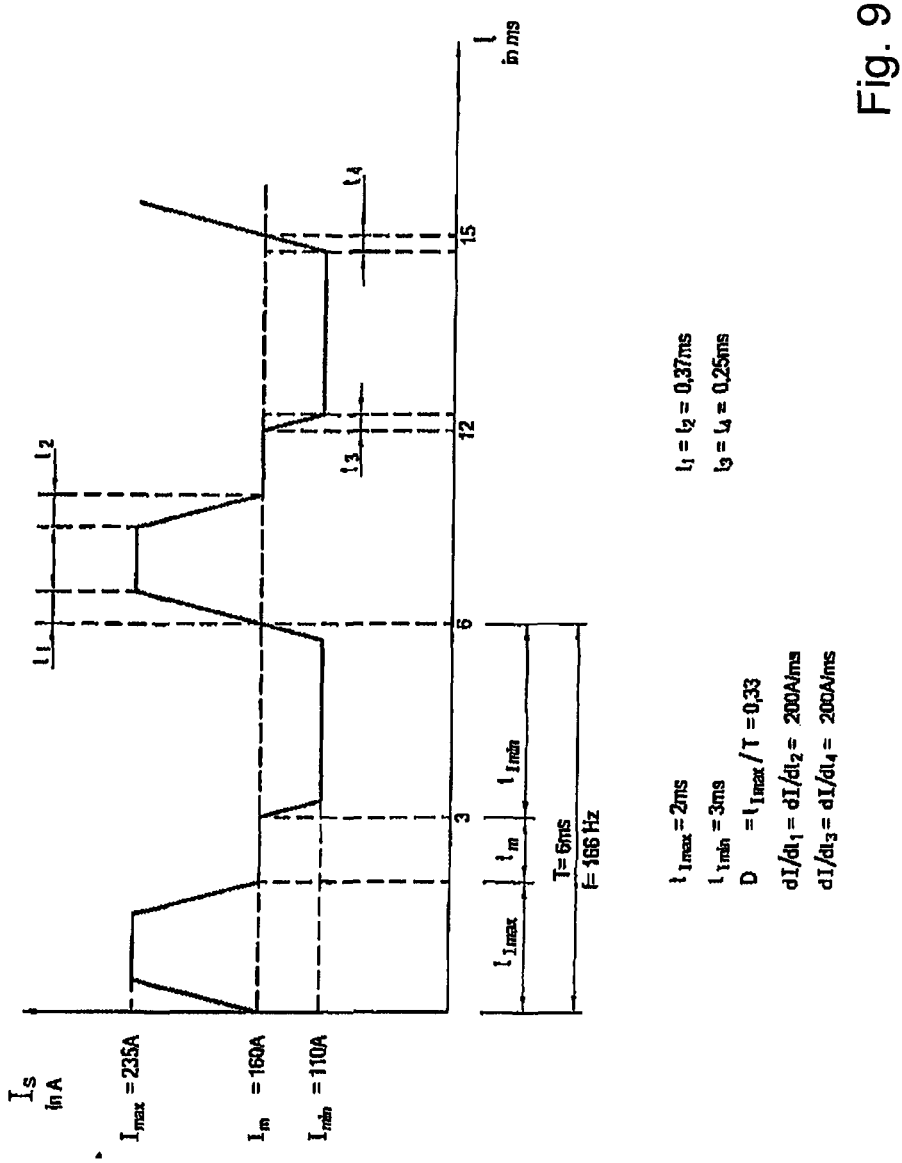

FIG. 9 also graphically depicts a trapezoidal current pattern, wherein the differences between the maximum cutting current $I_{max}$ and the arithmetic average $I_m$ of the cutting current $I_s$ and between the minimum cutting current and the arithmetic average $I_m$ of the cutting current $I_s$ and the times $t_{Imax}$ (2 ms) and $t_{Imin}$ (3 ms) are different and the cutting current is a time in relation to its arithmetic average value $I_m$:

$$|Imax-Im|=|235\ A-160\ A|=75\ A$$

$$|Imin-Im|=|110\ A-160\ A|=50\ A$$

The period duration T amounts to 6 ms and the frequency 166 Hz. The current change speeds are of equal magnitude in this example and amount to approximately 200 A/ms.

$$dI/dt_1=dI/dt_2=100\ A/0.37\ ms=200\ A/ms$$

$$dI/dt_3=dI/dt_4=50\ A/0.25\ ms=200\ A/ms$$

Figure 10:
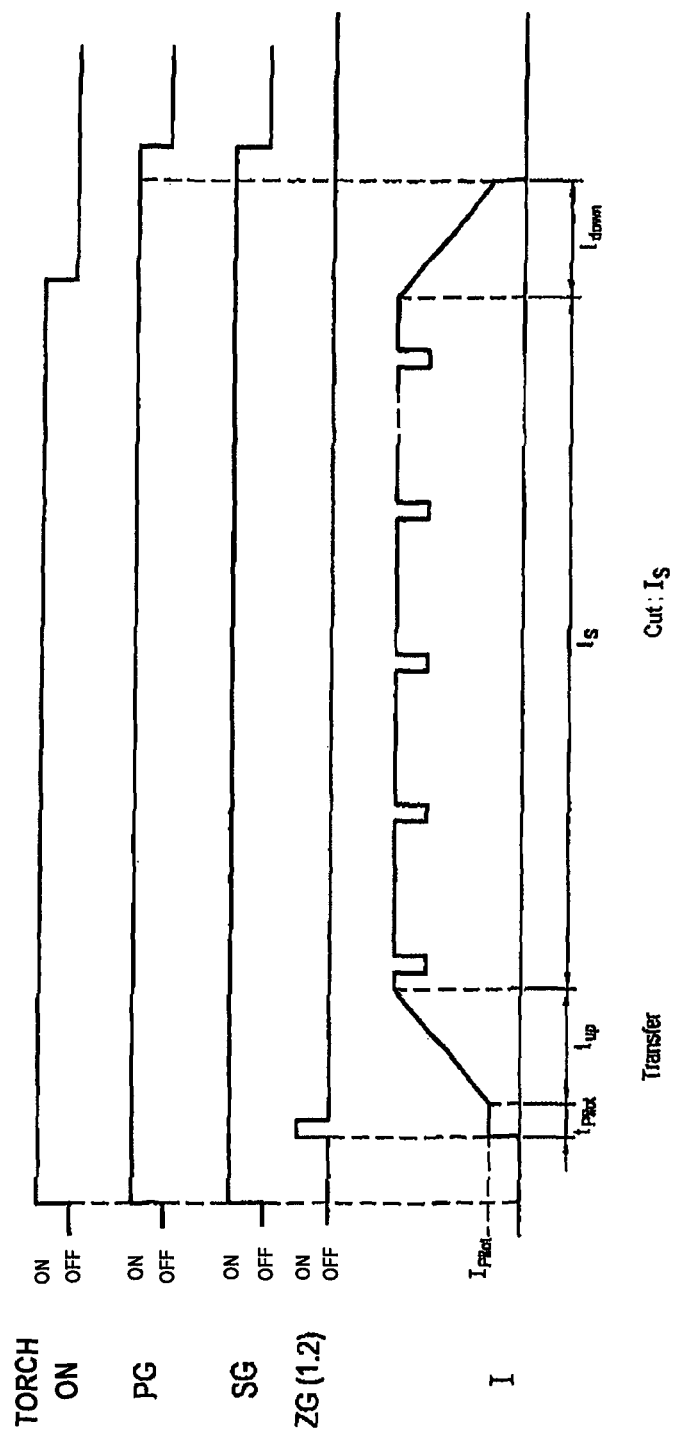
FIGS. 10 through 18 graphically depict particular embodiments of the plasma cutting process according to a second aspect of the present invention.
Figure 11:
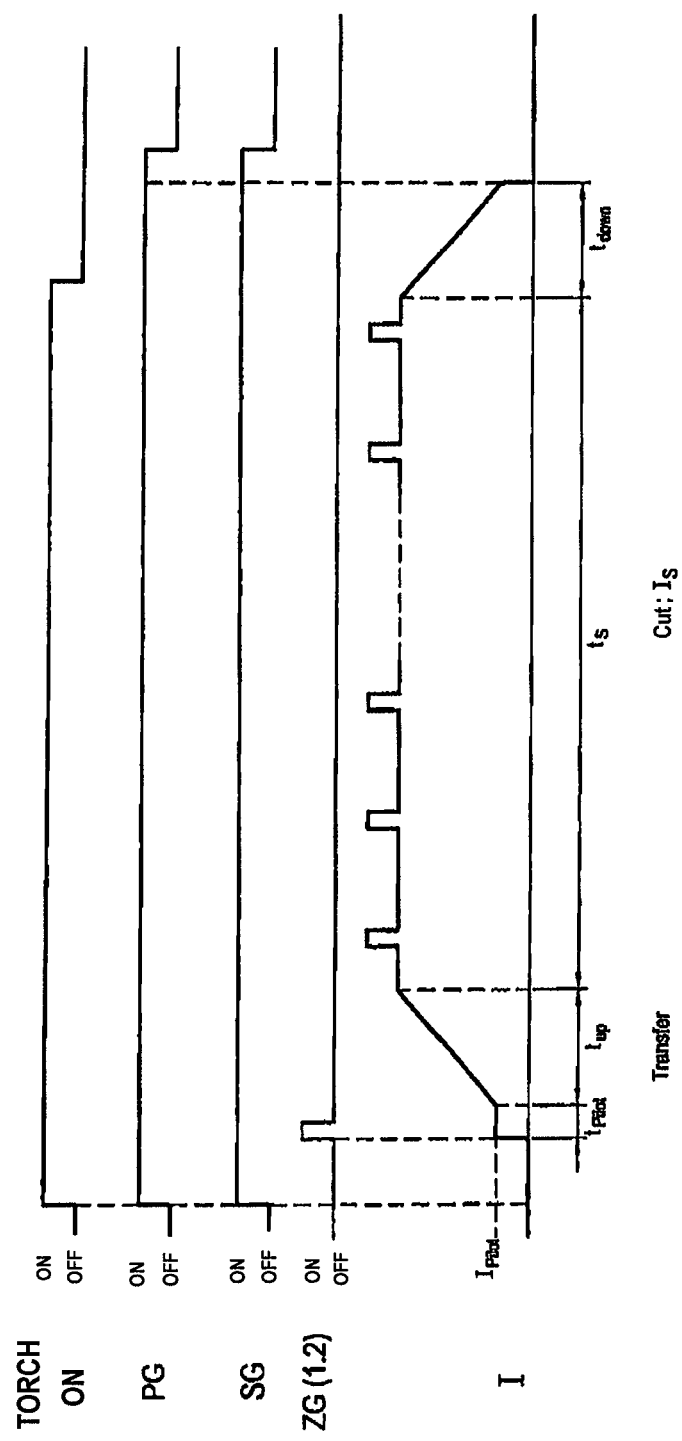
Figure 12:
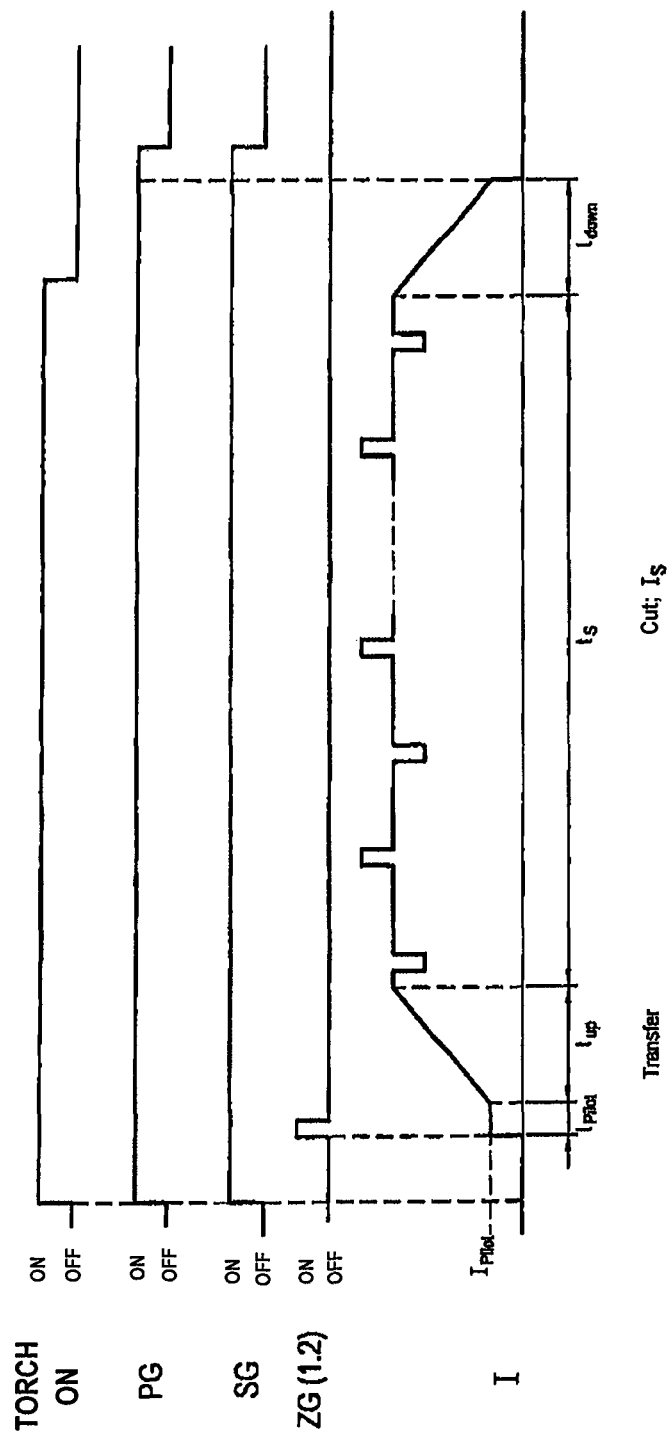
Figure 13:
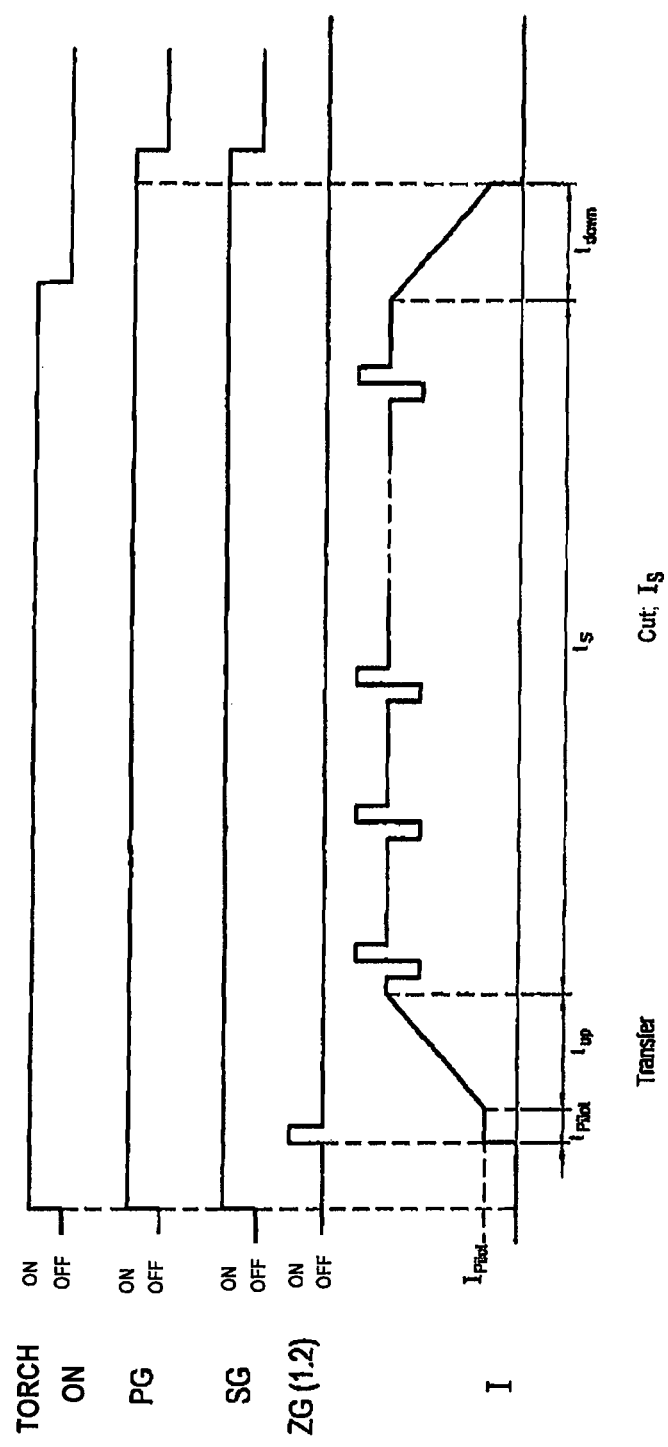

FIGS. 10 to 13 graphically depict particular embodiments of the plasma cutting method according to the second aspect of the present invention. Instead of a superimposition of a direct current with an alternating current the cutting current can be described in these cases as a periodically repeating pulse sequence. In FIGS. 10 and 11 the signal form with the period duration (T =1/f) contains a rectangular pulse downwards (FIG. 10) or a rectangular pulse upwards (FIG. 11), starting from a base value. In FIGS. 12 and 13, in comparison, the signal form comprises both a rectangular impulse upwards and downwards, whereby the signal forms in FIGS. 12 and 13 differ merely in the time distance between the rectangular pulses upwards and downwards.

Figure 14:
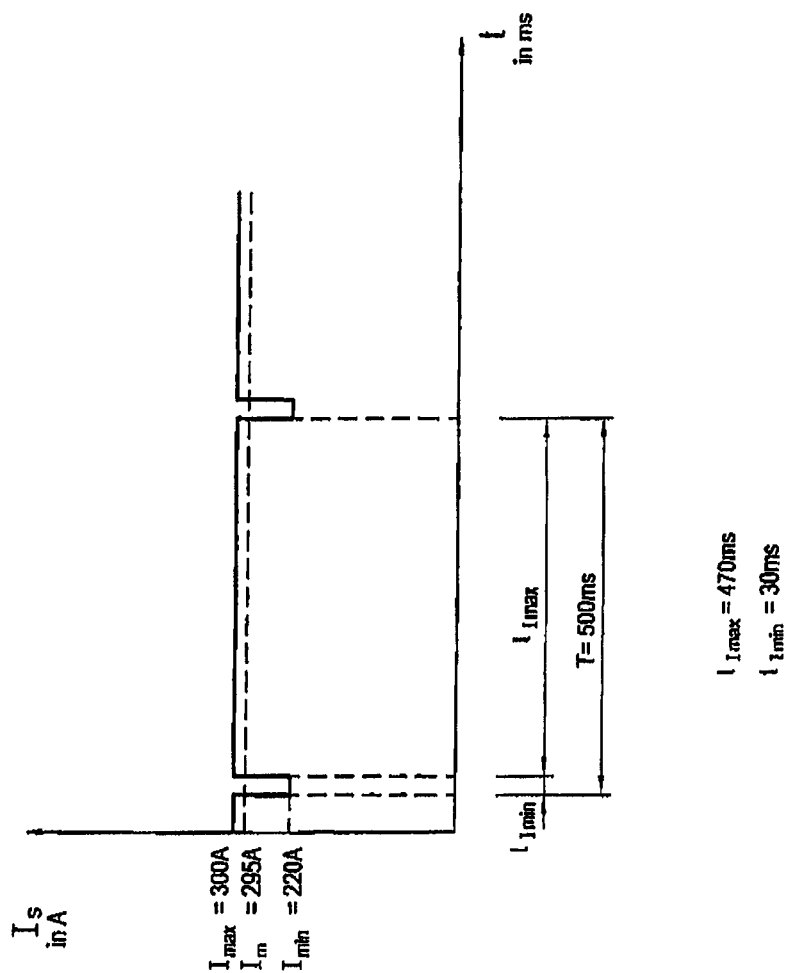
Figure 15:
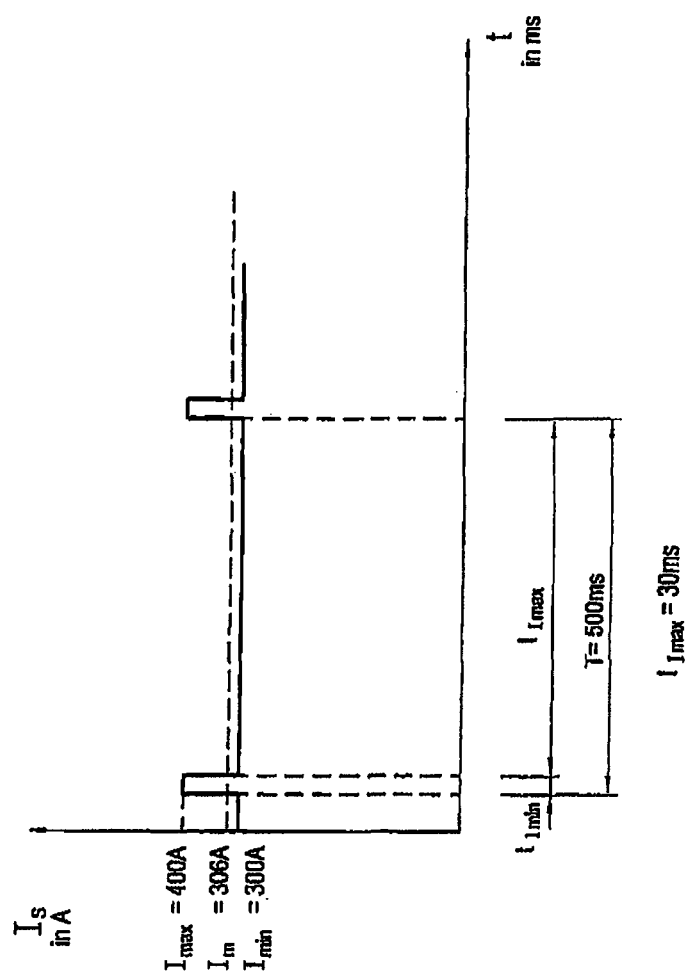

FIG. 14 graphically depicts a concrete numerical example for the embodiment according to FIG. 10, while in FIG. 15 a concrete embodiment for the embodiment form according to FIG. 11 is shown. In both cases the following applies for the sum of $t_{Imax}$ (the high threshold duration), and of $t_{Imin}$ (the low threshold duration), and the period T:

$$t_{Imin}+t_{Imax}=T,$$

whereby T is 500 ms, $t_{Imax}$ 470 ms and $t_{Imin}$ 30 ms. For $I_{max}$ (high threshold)=300 A and $I_{min}$ (low threshold)=220 A there is an arithmetic average $I_m$ of the cutting current at the level of 295 A.

In an example graphically depicted in FIG. 15, the period duration T (=1/f) is also 500 ms, but $t_{Imax}$ is 30 ms and $t_{Imin}$ 470 ms. When $I_{max}$=400 A and $I_{min}$=300 A, there is an arithmetic average $I_m$ of the cutting current $I_s$ of 306 A.

Figure 16:
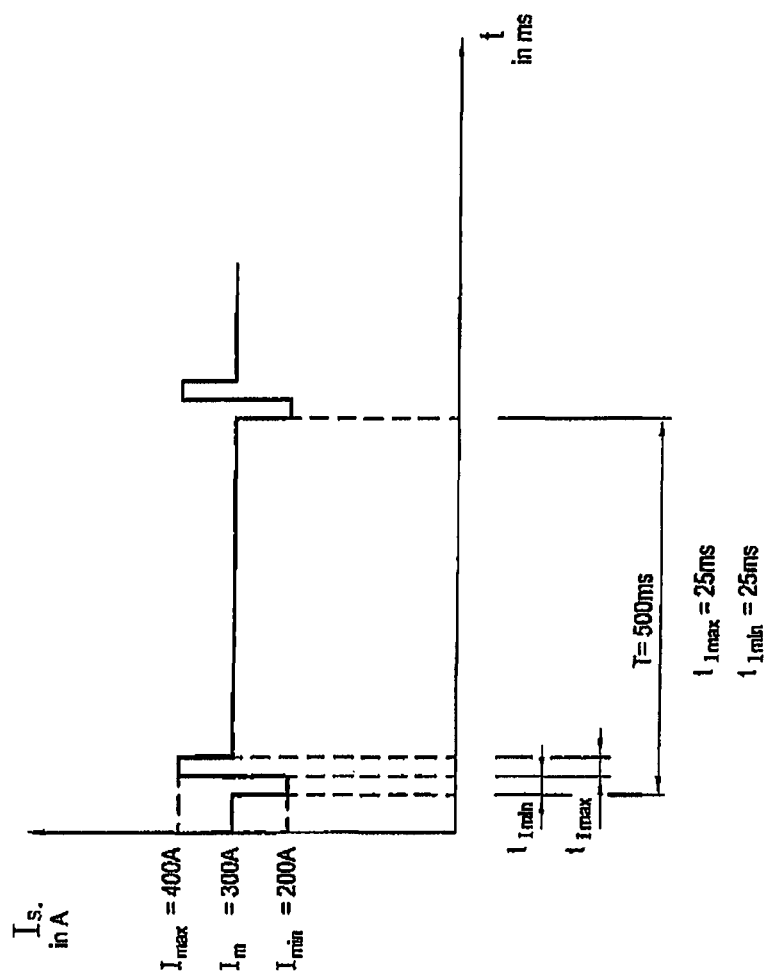
Figure 17:
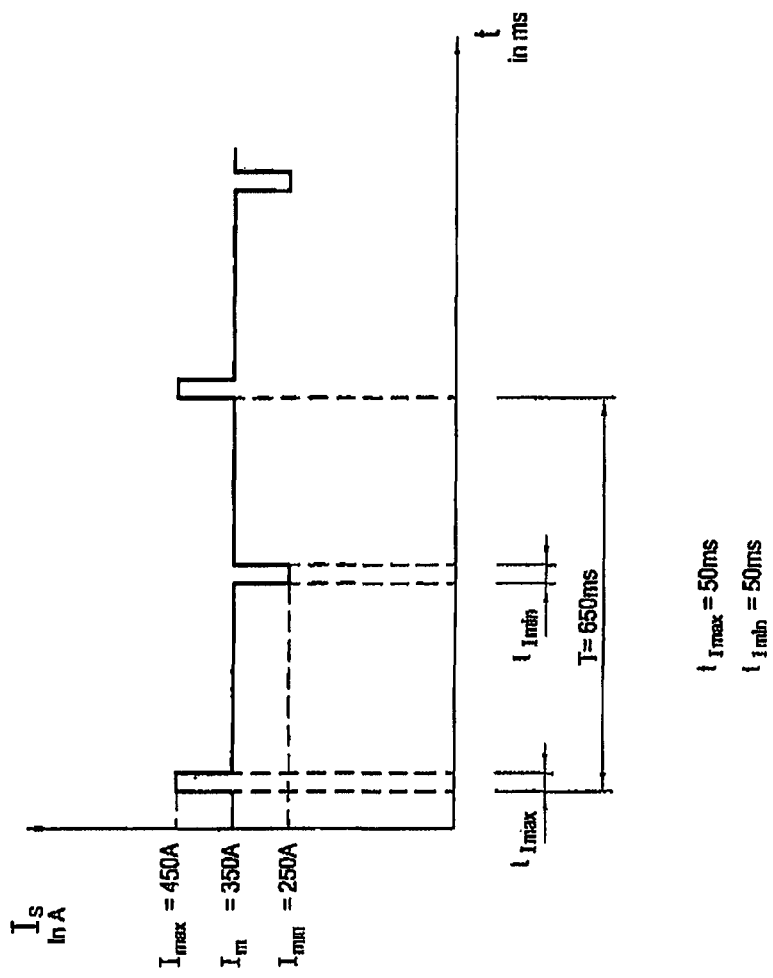

FIGS. 16 and 17 graphically depict examples in which the following applies for the pulses of the cutting current $I_s$:

$$t_{Imin}+t_{Imax}<T$$

FIG. 16 graphically depicts a numerical example for the embodiment according to FIG. 13, while FIG. 17 graphically depicts a numerical example for the embodiment according to FIG. 14. In FIG. 16 the period duration T is 500 ms, while both $t_{Imax}$ and $t_{Imin}$ are clearly smaller, namely being respectively 25 ms. For $I_{max}$=400 A and $I_{min}$=200 A, there is thus an arithmetic average value $I_m$ of the cutting current $I_s$ of 300 A.

In FIG. 17 the period duration T is 650 ms and $t_{Imax}$ and $t_{Imin}$ are clearly lower, namely respectively 50 ms. With a maximum current $I_{max}$ of 450 A and a minimum current of $I_{min}$ of 250 A, there is thus an arithmetic average value $I_m$ of 350 A.

Figure 18:
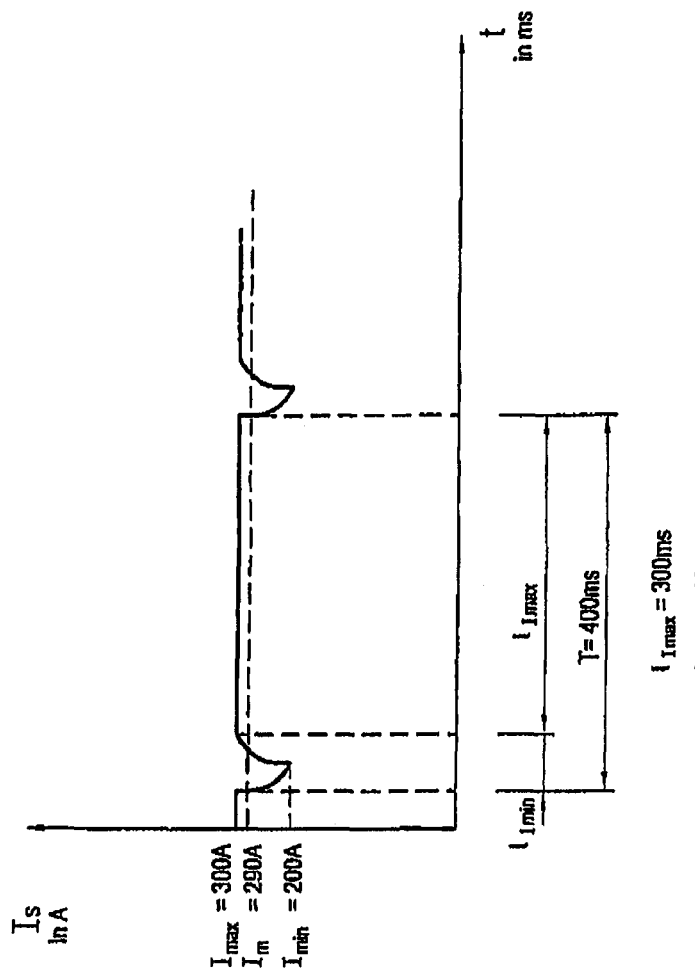

In the signal pattern graphically depicted in FIG. 18 of the cutting current $I_s$ there is in turn a pulse sequence with a period duration T (=400 ms)=$t_{Imin}$+$t_{Imax}$, wherein $t_{Imax}$ is 300 ms and $t_{Imin}$ is 100 ms. The periodic signal form does not have, however, a rectangular pulse but instead a tooth-like or barb-like progression. $t_{Imin}$ corresponds to the time during which the cutting current $I_s$ deviates from $I_{max}$ (=300 A). In case of a minimum current of $I_{min}$, of 200 A, there is thus an arithmetic average value $I_m$ of the cutting current $I_s$ of 290 A.

Figure 19:
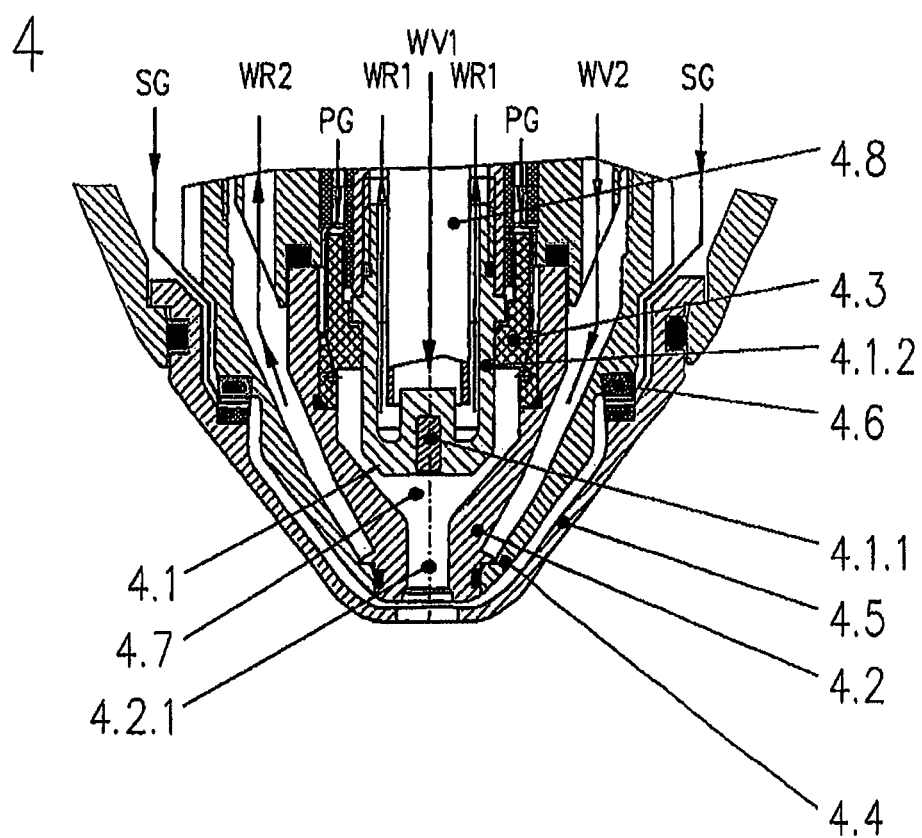
FIG. 19 depicts a side cross sectional view of a plasma torch with a flat electrode.

Finally FIG. 19 depicts a cross sectional side view of a plasma torch 4 with a flat electrode 4.2, that can be advantageously used with the invention.

The depicted components of the plasma torch 4 (of which only a plasma torch head is shown) are an electrode 4.1 in the form of a flat electrode, which includes an electrode holder 4.1.1 and an emission insert 4.1.2, a nozzle 4.2 with a nozzle bore 4.2.1, wherein the nozzle 4.2 and the electrode 4.1 form between them a plasma chamber 4.7. A plasma gas PG is conveyed into the plasma chamber 4.7 by a plasma gas guide 4.3 which sets the plasma gas in rotation through appropriately arranged bores, and in the plasma chamber 4.7 it is ionised by a plasma arc and a plasma jet 6 (not shown, but see FIG. 1) is formed. The nozzle 4.2 is fixed by a nozzle cap 4.4. In the area enclosed by both, a coolant flows from a coolant supply WV2 to a coolant return WR2 and cools the nozzle 4.2 and the nozzle cap 4.4. The electrode 4.1 formed hollow inside, into which a cooling pipe 4.8 projects, is also cooled by a coolant. The coolant flows from a coolant supply WV1 through the cooling pipe 4.8 into the hollow chamber of the electrode 4.1 to the electrode tip and then between the cooling pipe 4.8 and the electrode 4.1 to a coolant return WR1. Distilled water, which can be provided with a frost protection additive, is used in this example as a coolant. A water cooling circuit (not shown) is advantageous for cooling the coolant by means of a heat exchanger (not shown) or a refrigerating machine (not shown) and feeds the coolant via a pump (not shown) back to the plasma torch. The volume flow and temperature of the coolant can thereby be monitored and/or controlled.

The secondary gas SG flows into a chamber between the nozzle cap 4.4 and a nozzle protection cap 4.5 and is set in rotation through a secondary gas guide 4.6 through appropriate bores and then fed to the plasma jet 6. The secondary gas SG protects, in combination with the nozzle protection cap 4.5, in particular the nozzle 4.2, and the nozzle cap 4.4 upon penetration into a workpiece 5 (see FIG. 1) against damage from spattering material.

Figure 19A:
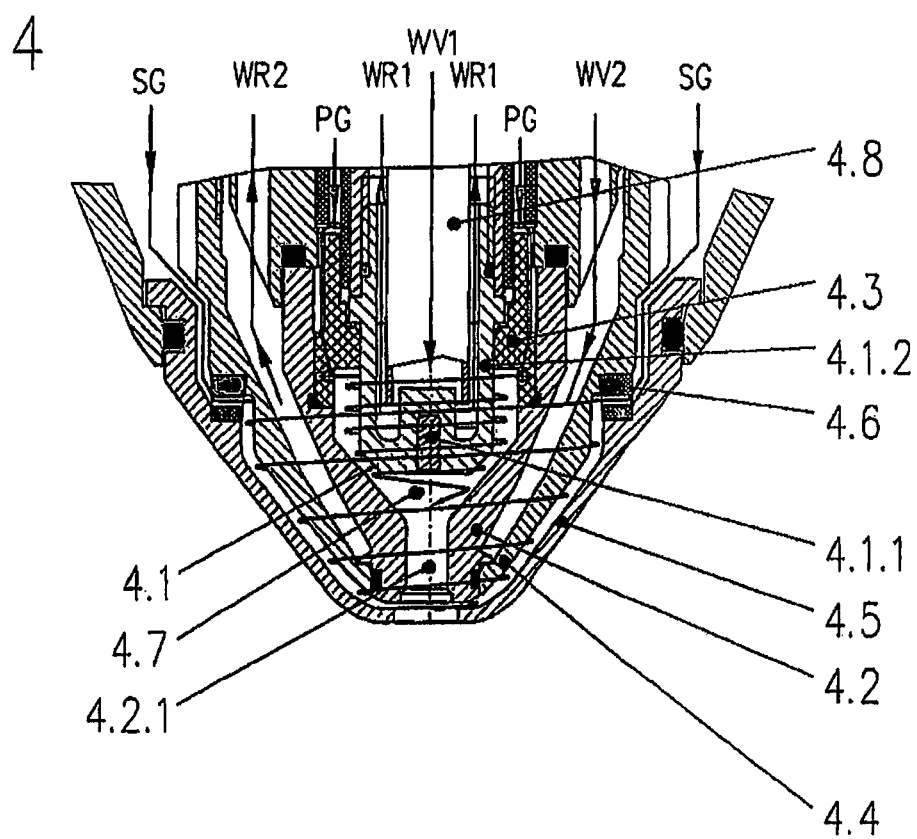
FIG. 19a depicts the plasma torch of FIG. 19 additionally with rotation of plasma gas and secondary gas.

FIG. 19a additionally depicts, schematically, the rotation of the plasma gas PG and the secondary gas SG produced by the respective gas guide.

Further aspects of the current invention also include:
that the current I fluctuates periodically, i.e. with constant frequency f;
that the frequency of the cutting voltage is independent and/or kept constant;
that the current I fluctuates around its arithmetic average during the whole process (pilot, transfer ($t_{up}$), cutting ($t_s$), current reduction at the end of cutting ($t_{down}$);
that the current fluctuates around its arithmetic average during cutting ($t_s$), transfer ($t_{up}$) and/or current reduction ($t_{down}$);
that the current I fluctuates around its arithmetic average only after reaching said arithmetic average predefined for cutting;
that the current I fluctuates around its arithmetic average only at least 1 second after reaching said arithmetic average value predefined for cutting;
that the average current density of the area of the nozzle bore 4.2.1 is between about 30 and 150 A/mm$^2$;
that the average current density of the area of the nozzle bore 4.2.1 is between about 60 and 150 A/mm$^2$;
that the plasma gas PG is set in rotation through a gas guide in the space between the electrode 4.1 and the nozzle 4.2;
that the volume flow of the plasma gas PG lies in the range of from about 700 l/h to 7000 l/h;
that the pressure of the plasma gas PG in the space between the electrode 4.1 and the nozzle 4.2 lies between about 2.5 and 8 bar;
that the plasma gas PG is oxygen, an oxygen-containing gas or gas mixture;
that the plasma gas PG comprises at least a molecular gas such as oxygen, nitrogen, and/or hydrogen;
that the plasma gas PG comprises at least at the rate of 30% by volume of a molecular gas such as oxygen, nitrogen, and/or hydrogen;
that the plasma torch 4 has water cooling;
that a database is provided, in which by way of cutting parameters of at least material, cutting current, cutting speed and plasma gas are defined;
that an electrode 4.1 for a plasma torch is provided, wherein the electrode holder 4.1.1 is hollow inside and forms an inner surface;
that the electrode 4.1 is formed as a flat electrode;
that the electrode 4.1 is water cooled;
that the emission insert 4.1.2 has a diameter of about 0.9 to 8 mm;
that the nozzle bore 4.2.1. has a diameter of about 0.4 to 7 mm;
that the nozzle 4.2 is water cooled;
that a gas guide part is present in the space between the electrode 4.1 and the nozzle 4.2;
that a nozzle protection cap 4.5 is present;
that a gas guide ring is present between the nozzle protection cap 4.5 and the nozzle cap 4.4 or nozzle 4.2;
that the gas guide ring sets the secondary gas SG in rotation.

The features of the invention disclosed in the present description, in the drawings and in the claims can be essential both individually and also in any combination for the realisation of the invention in its different embodiments.

The invention claimed is:

1. A method for plasma cutting a workpiece by means of a plasma cutting system, which comprises a plasma current source and a plasma torch, which comprises an electrode and a nozzle, having a gap to form a plasma chamber therebetween, the method comprising:
sending to the plasma torch, from a gas console, both a plasma gas and a secondary gas, the secondary gas being fed to a plasma jet through a secondary gas guide;
producing a cutting current by the plasma current source through the plasma torch and raising said cutting current in a targeted or controlled manner to a target arithmetic mean specified for plasma cutting;
maintaining the cutting current at the target arithmetic mean for at least one second; and
creating a pulsating cutting current $I_S$ by fluctuating said cutting current after maintaining the pulsating cutting current, at an arbitrary frequency f in a range of 0.1 Hz to 500 Hz.

2. The method for plasma cutting a workpiece of claim 1 wherein the arbitrary frequency f is in the range of from about 35 Hz to 500 Hz.

3. The method for plasma cutting a workpiece of claim 1 wherein the arbitrary frequency f is in the range of from about 55 Hz to 400 Hz.

4. The method for plasma cutting a workpiece of claim 1 wherein the pulsating cutting current $I_S$ fluctuates around an arithmetic average $I_m$ with at least one freely selectable peak value $I_{min}$ or $I_{max}$ in the range of from about 5% to 70% around the arithmetic average $I_m$.

5. The method for plasma cutting a workpiece of claim 1 wherein the pulsating cutting current $I_S$ fluctuates around an arithmetic average $I_m$ with at least one freely selectable peak value $I_{min}$ or $I_{max}$ in the range of from about 10% to 50% around the arithmetic average $I_m$.

6. The method for plasma cutting a workpiece of claim 1 wherein a minimum deviation of a peak value $I_{max}$ or $I_{min}$ from an arithmetic average value $I_m$ of the pulsating cutting current $I_s$ is 5 A.

7. The method for plasma cutting a workpiece of claim 1 wherein a minimum deviation of a peak value $I_{max}$ or $I_{min}$ from an arithmetic average value $I_m$ of the pulsating cutting current $I_s$ is 10 A.

8. The method for plasma cutting a workpiece of claim 1 wherein a minimum deviation of a peak value $I_{max}$ or $I_{min}$ from an arithmetic average value $I_m$ of the pulsating cutting current $I_s$ is 20 A.

9. The method for plasma cutting a workpiece of claim 1 wherein the maximum deviation of a peak value $I_{max}$ or $I_{min}$ from an arithmetic average value $I_m$ of the pulsating cutting current $I_s$ is 200 A.

10. The method for plasma cutting a workpiece of claim 1 wherein the maximum deviation of a peak value $I_{max}$ or $I_{min}$ from an arithmetic average value $I_m$ of the pulsating cutting current $I_s$ is 100 A.

11. The method for plasma cutting a workpiece of claim 1 wherein the amount of the maximum current change speed dI/dt of the pulsating cutting current $I_s$ is 400 A/ms.

12. The method for plasma cutting a workpiece of claim 1 wherein the amount of the minimum current change speed dI/dt of the pulsating cutting current $I_s$ is 2 A/ms.

13. The method for plasma cutting a workpiece of claim 1 wherein the scanning ratio $D=t_{Imax}/T$ of the pulsating cutting current $I_s$ lies between about 0.1 and 0.9.

14. The method for plasma cutting a workpiece of claim 1 wherein the scanning ratio $D=t_{Imax}/T$ of the pulsating cutting current $I_s$ lies between about 0.3 and 0.7.

15. The method for plasma cutting a workpiece of claim 1 wherein the freely selectable frequency f is in the range of from about 0.1 Hz to 29 Hz.

16. The method for plasma cutting a workpiece of claim 1 wherein the freely selectable frequency f is in the range of from about 0.1 Hz to 20 Hz.

17. The method for plasma cutting a workpiece of claim 1 wherein each cutting current pulse of the pulsating cutting current $I_s$ has a low threshold duration $t_{Imin}$ and a high threshold duration $t_{max}$ such that:

$$t_{Imin}+t_{Imax}=T;$$

where period duration T=1/f; and $t_{Imin}$ or $t_{Imax}$<25% of the period duration T.

18. The method for plasma cutting a workpiece of claim 1 wherein each cutting current pulse of the pulsating cutting current $I_s$ has a low threshold duration $t_{Imin}$ and a high threshold duration $t_{Imax}$ such that:

$$t_{Imin}+t_{Imax}=T;$$

where period duration T=1/f; and $t_{Imin}$ or $t_{Imax}$<15% of the period duration T.

19. The method for plasma cutting a workpiece of claim 1 wherein each cutting current pulse of the pulsating cutting current $I_s$ has a low threshold duration $t_{Imin}$ and a high threshold duration $t_{Imax}$ such that:

$$t_{Imin}+t_{Imax}=T;$$

where period duration T=1/f; and $t_{Imin}$ or $t_{Imax}$<50% of the period duration T.

20. The method for plasma cutting a workpiece of claim 1 wherein each cutting current pulse of the pulsating cutting current $I_s$ has a low threshold duration $t_{Imin}$ and a high threshold duration $t_{Imax}$ such that:

$$t_{Imin}+t_{Imax}=T;$$

where period duration T=1/f; and $t_{Imin}$ or $t_{Imax}$<30% of the period duration T.

21. The method for plasma cutting a workpiece of claim 1 wherein a cutting voltage comprises an arithmetic average value in the range of from about 90 V to 250 V.

22. The method for plasma cutting a workpiece of claim 1 wherein a cutting voltage comprises an arithmetic average value in the range of from about 120 V to 220 V.

23. The method for plasma cutting a workpiece of claim 1 wherein plasma gas volume flow is kept constant.

24. The method for plasma cutting a workpiece of claim 1 wherein the electrode is a flat electrode.

25. The method for plasma cutting a workpiece of claim 1 wherein plasma gas is brought into rotation in the plasma chamber.

26. The method for plasma cutting a workpiece of claim 1 wherein an oxygen-containing plasma gas is used.

27. The method for plasma cutting a workpiece of claim 1 wherein the arithmetic average of the cutting current $I_s$ has a value in the range of from about 25 A to 500 A.

28. The method for plasma cutting a workpiece of claim 1 further comprising:
    Providing a direct current cutting current; and
    Creating the conditions for the direct current cutting current to meet the target range by either superimposing an alternating current or fluctuating the direct current cutting current.

29. The method for plasma cutting a workpiece of claim 1 wherein the secondary gas is set in rotation through the secondary gas guide through bores and fed to the plasma jet.

* * * * *